W. A. OWEN.
POWER TRANSMITTING PULLEY.
APPLICATION FILED SEPT. 7, 1909.
958,274.
Patented May 17, 1910.
2 SHEETS—SHEET 1.
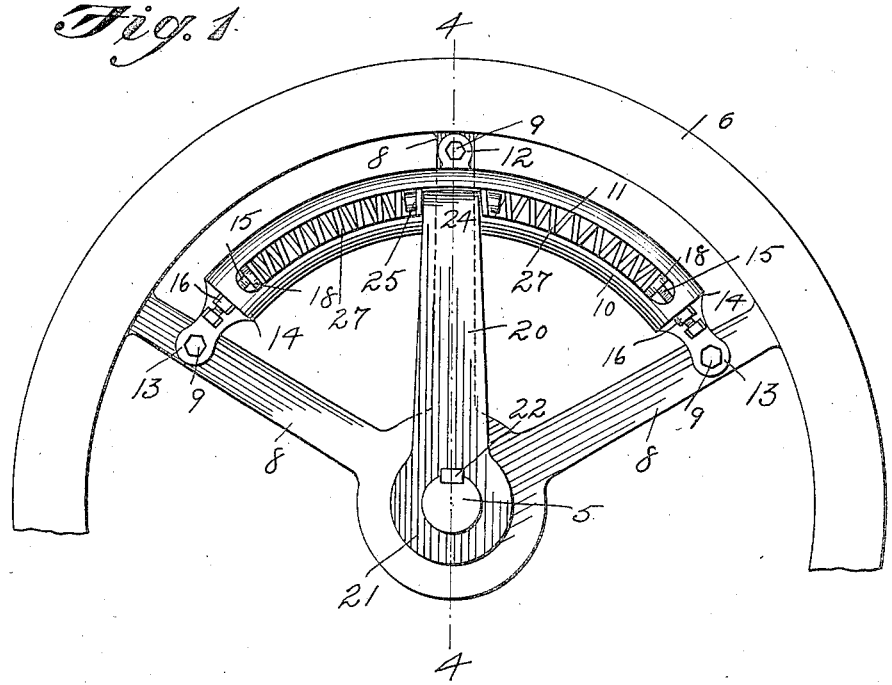
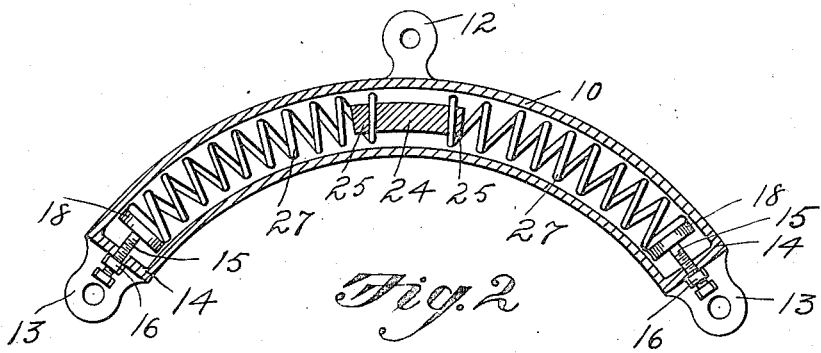
WITNESSES
INVENTOR
William A. Owen
By Woodward & Chandlee
Attorneys W. A. OWEN.
POWER TRANSMITTING PULLEY.
APPLICATION FILED SEPT. 7, 1909.
958,274.
Patented May 17, 1910.
2 SHEETS—SHEET 2.
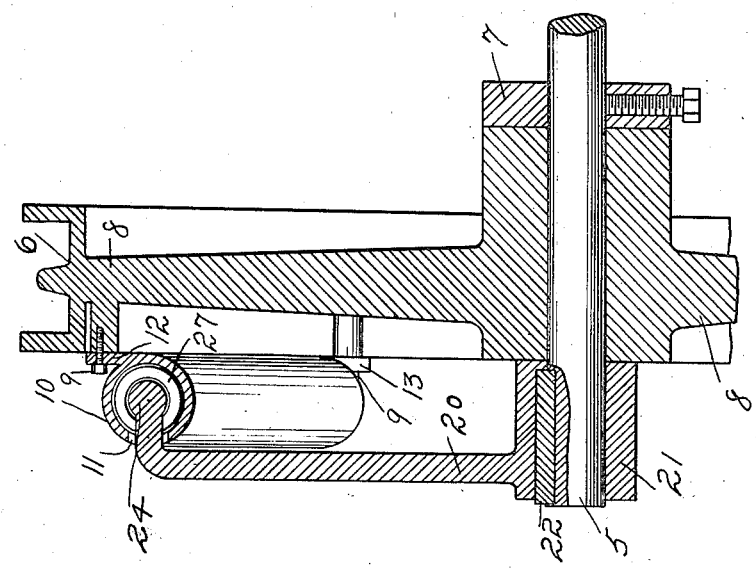
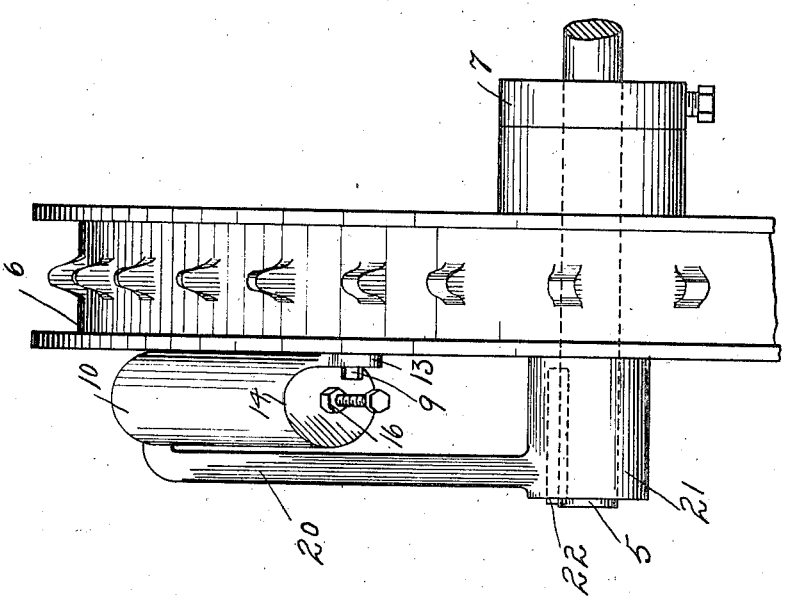
WITNESSES
W. G. Jones
M. L. Lowd.
INVENTOR.
William A. Owen
By Woodward & Chandler.
Attorneys ized rendering.

UNITED STATES PATENT OFFICE.

WILLIAM A. OWEN, OF JOHNSON CITY, TENNESSEE.

POWER-TRANSMITTING PULLEY.

958,274.  Specification of Letters Patent.  Patented May 17, 1910.

Application filed September 7, 1909. Serial No. 516,864.

*To all whom it may concern:*

Be it known that I, WILLIAM A. OWEN, a citizen of the United States, residing at Johnson City, in the county of Washington and State of Tennessee, have invented certain new and useful Improvements in Power-Transmitting Pulleys, of which the following is a specification.

This invention has relation to certain new and useful improvements in power transmitting pulleys and comprises a resiliently carried sprocket wheel.

The object of my invention is to so construct a sprocket wheel, that the mechanical shocks and vibrations incident to the working of the sprocket in connection with certain classes of machinery, will be absorbed or compensated.

With these and other objects in view, the present invention consists in the combination and arrangement of parts as will be hereinafter more fully described and particularly pointed out in the appended claim, it being understood that changes in the specific structure shown and described may be made within the scope of the claim without departing from the spirit of the invention.

In the drawings forming a part of this specification, and in which like numerals of reference indicate similar parts in the several views, Figure 1 shows a fragmentary side elevation of a sprocket constructed according to my invention. Fig. 2 is a central sectional view through the spring housing. Fig. 3 shows a fragmentary edge view. Fig. 4 is a section on line 4—4 of Fig. 1.

In the operation of certain classes of machinery, where driving chains are employed in place of belts, it is quite a common occurrence for the chain to tear off the sprocket teeth, where the applied power is irregular and the sprocket is subjected to sudden changes or unevenness in speed. In my present invention I provide a carrying member secured to the driving shaft to which is resiliently connected the sprocket, which is permitted an independent backward and forward movement, within certain limits, against the tension of suitable buffer springs.

In the drawings the numeral 5 designates a driving shaft, 6 a sprocket wheel, and 7 a collar secured to the driving shaft to hold the sprocket in position. Secured to the spokes 8 of the sprocket wheel 6, by means of the bolts 9, is the arcuate spring case 10 which is slotted lengthwise as shown at 11. This arcuate spring case is provided with the two terminal securing ears 13 and the intermediate securing ear 12 the bolts 9 passing through these securing ears. The case has its ends closed and is provided with a middle lengthwise positioned laterally entering slot 11, ending proximal to the ends 14 of the case. Held within the ends 14 of the case are the set screws 15 carrying the lock nuts 16 and at its inner end each set screw carries a follower disk 18 as clearly disclosed in Fig. 1. The sprocket 6 is revolubly held upon the shaft 5 and is resiliently connected thereto by means of a buffer arm 20 having the hub 21 which by means of a key 22 is fixed to the driving shaft. This buffer arm has the offset head 24 extending laterally from the arm and entering the slot 11 of the arcuate spring case 10. The head 24 is provided with the lugs 25 extending in opposite direction as clearly disclosed in Fig. 1. Held upon these lugs 25, and against the follower disks 18, are the helical buffer springs 27 two such springs being employed.

From the foregoing description it will be seen that the sprocket is resiliently connected to the buffer arm 20 and is permitted an independent backward and forward movement against the tension of the buffer springs 27. By means of the set screw 15, the tension of these springs can be nicely regulated. With this arrangement, any sudden or irregular movement of the driving shaft will be absorbed or compensated by the buffer springs. This attachment may be fixed to sprocket wheels now in use as the same forms an independent part of the wheel.

The device is simple and inexpensive in construction and both durable and efficient in operation.

Having thus described my said invention, what I claim as new and desire to secure by United States Letters Patent is:

The combination with a driving shaft, of a sprocket wheel loosely mounted thereon, a collar secured to said shaft, a hub secured to said shaft and against said wheel opposite said collar having an arm extending from near the outer edge of said hub, ending in a laterally off-set head provided with lugs extending in opposite directions, an arcuate spring case secured to said wheel having its ends closed and provided with terminal securing ears with a middle lengthwise positioned laterally entering slot ending proximal to said case ends, each case end having a threaded opening, said head being arranged to enter said slot and centrally held in said case, a set screw within each case end, a follower disk at each end of said case and working against a set screw, and two helical springs within said case, one being carried upon each lug and working against a follower disk, all arranged as and for the purpose set forth.

In testimony whereof I affix my signature, in presence of two witnesses.

WILLIAM A. OWEN.

Witnesses:
J. T. CECIL,
C. G. MITCHELL.